United States Patent
Furui

(10) Patent No.: US 8,425,050 B2
(45) Date of Patent: Apr. 23, 2013

(54) PROJECTION DISPLAY DEVICE AND KEYSTONE CORRECTION METHOD

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 275 days.

(21) Appl. No.: 12/881,358

(22) Filed: Sep. 14, 2010

(65) Prior Publication Data

US 2011/0069284 A1 Mar. 24, 2011

(30) Foreign Application Priority Data

Sep. 18, 2009 (JP) ................. 2009-217091

(51) Int. Cl.
*G03B 21/14* (2006.01)
*G03B 21/00* (2006.01)
*H04N 3/23* (2006.01)
*H04N 3/22* (2006.01)

(52) U.S. Cl.
USPC ............... 353/70; 353/69; 353/121; 348/746; 348/806

(58) Field of Classification Search .................... 353/70, 353/69, 121, 101; 348/746, 806
See application file for complete search history.

(56) References Cited

U.S. PATENT DOCUMENTS

| 8,186,835 B2* | 5/2012 | Furui ........................... 353/70 |
| 2006/0038962 A1* | 2/2006 | Matsumoto et al. ............ 353/69 |
| 2008/0204670 A1* | 8/2008 | Furui ........................... 353/69 |

FOREIGN PATENT DOCUMENTS

| JP | 2008-306644 A | 12/2008 |
| JP | 2008-312127 A | 12/2008 |

* cited by examiner

*Primary Examiner* — Tony Ko
*Assistant Examiner* — Magda Cruz
(74) *Attorney, Agent, or Firm* — ALG Intellectual Property, LLC

(57) ABSTRACT

A projection display device includes: a projection section having an optical system; a parameter obtaining section adapted to obtain a first parameter corresponding to the projection angle showing a relative posture of the projection display device to the projection surface; a vanishing point calculation section adapted to calculate a position of a vanishing point based on the first parameter; an actual zoom ratio obtaining section adapted to obtain an actual zoom ratio; a parameter calculating section adapted to correct the first parameter based on a fixed reference zoom ratio and the actual zoom ratio to thereby calculate a second parameter; and a keystone correction section adapted to perform a keystone correction of the image based on the fixed reference zoom ratio and the second parameter.

9 Claims, 11 Drawing Sheets

ZOOM RATIO $Z_0$

ARITHMETIC PROCESSING BY PROJECTOR 100

ZOOM RATIO $Z_1$ ($Z_0 < Z_1$)

ZOOM RATIO: MINIMUM

ZOOM RATIO: MAXIMUM

PROJECTION DISPLAY DEVICE AND KEYSTONE CORRECTION METHOD

BACKGROUND

1. Technical Field

The present invention relates to a projection display device, and in particular to a technology of correcting distortion of an image displayed on a projection screen.

2. Related Art

Projectors usually project images on projection surfaces using tilted projection. The tilted projection denotes a projection method in the casein which the light axis of the light source of the projector does not intersect with the projection surface perpendicularly. If the tilted projection is performed, the image displayed on the projection surface is distorted. Therefore, the projectors perform correction (hereinafter also referred to as keystone correction) so as to display images without distortion on the projection surfaces, namely rectangular images each having a correct aspect ratio, by forming distorted images on image forming sections such as liquid crystal panels. As a technology of correcting the distortion due to the tilted projection, there is known a technology described in JP-A-2008-306644 and JP-A-2008-312127.

In the case of performing the keystone correction due to the tilted projection, the value of the zoom ratio and the angle (hereinafter also referred to as a projection angle) between the projection surface and the projection light axis of the projector when the projection is performed by the projector become necessary in the correction process. However, projectors usually perform the keystone correction using the value of a predetermined zoom ratio (hereinafter also referred to as a set zoom ratio) set previously instead of the actual zoom ratio (hereinafter also referred to as a projection zoom ratio) when performing the projection, and the projection angle when performing the actual projection. In this case, since the keystone correction operation based on the projection zoom ratio, which is the zoom ration when performing the actual projection, is not performed, the image projected on the screen might become far different from the image with a rectangular shape of the correct aspect ratio in some cases.

SUMMARY

An advantage of some aspects of the invention is to solve at least a part of the problem described above, and the invention can be implemented as following embodiments or application examples.

APPLICATION EXAMPLE 1

According to this application example of the invention, there is provided a projection display device including a projection section having an optical system capable of zooming a projection image to be projected on a projection surface, and adapted to project an image, a parameter obtaining section adapted to obtain a first parameter corresponding to the projection angle showing a relative posture of the projection display device to the projection surface, a vanishing point calculation section adapted to calculate a position of a vanishing point in displaying the image by projection on the projection surface with the projection angle, based on the first parameter, an actual zoom ratio obtaining section adapted to obtain an actual zoom ratio at which the projection section actually displays the image by projection on the projection surface, a parameter calculating section adapted to correct the first parameter based on a fixed reference zoom ratio and the actual zoom ratio to thereby calculate a second parameter, and a keystone correction section adapted to perform a keystone correction of the image based on the fixed reference zoom ratio and the second parameter.

According to the projection display device, since the first parameter is corrected to the second parameter, the keystone correction corresponding to the actual zoom ratio can be performed using the keystone correction section for performing the keystone correction assuming that the zoom ratio of the optical system is the fixed reference zoom ratio.

APPLICATION EXAMPLE 2

This application example of the invention is directed to the projection display device of Application Example 1 of the invention, wherein the parameter calculating section calculates a correction target point which corresponds to the vanishing point based on the fixed reference zoom ratio and the actual zoom ratio, and to correct the first parameter based on the correction target point to thereby calculate the second parameter.

APPLICATION EXAMPLE 3

This application example of the invention is directed to the projection display device of Application Example 2 of the invention, wherein the parameter calculation section calculates a position of one of the two correction target points based on the fixed reference zoom ratio and the actual zoom ratio, and a position of the vanishing point, and calculates a position of the other of the correction target points approximately using a condition, which is used when obtaining the position of the one of the correction target points, as a limiting condition, and to correct the first parameter based on the positions of the two correction target points calculated, to thereby calculate the second parameter.

The calculation condition of the position of one of the correction target points and the calculation condition of the position of the other of the correction target points are associated with each other. According to the projection display device, since the condition used when obtaining the position of one of the correction target points is used as the limiting condition for approximately calculating the other of the correction target points, it is possible to correctly calculating the one of the correction target point, and it is possible to calculate the most approximate position of the other of the correction target points taking the calculation condition of the position of the one of the correction target point into consideration.

APPLICATION EXAMPLE 4

This application example of the invention is directed to the projection display device of Application Example 3 of the invention, wherein the one of the correction target point is a correction target point corresponding to the vanishing point regarding a vertical direction, and the other of the correction target point is a correction target point corresponding to the vanishing point regarding a horizontal direction.

According to the projection display device of this application example of the invention, it is possible to perform the keystone correction accurately for the vertical direction of the image projected on the projection surface after performing the keystone correction.

APPLICATION EXAMPLE 5

This application example of the invention is directed to the projection display device of Application Example 4 of the invention, wherein in a coordinate system having a z-axis representing a normal direction of the projection surface, an x-axis representing a horizontal direction, and a y-axis representing a vertical direction when taking a principal point of a zoom lens provided to the projection display device as an origin, when a pitch angle θ, which is a relative angle between the projection surface and the projection display device using the x-axis as an axis, is $\theta_0$, the parameter calculation section applies the following formula to calculate a correction pitch angle $\theta_1$ corresponding to one of the second parameters. ($Z_0$=(actual zoom ratio), $Z_1$=(reference zoom ratio))

$$\theta_1 = \operatorname{Arctan}\left(\frac{Z_0}{Z_1}\tan\theta_0\right) \quad \text{(Formula)}$$

According to the projector display device of this application example of the invention, the second parameter corresponding to the pitch angle θ can be calculated with respect to the first parameter.

APPLICATION EXAMPLE 6

This application example of the invention is directed to the projection display device of Application Example 5 of the invention, wherein the parameter calculation section uses the correction pitch angle $\theta_1$ as the limiting condition when approximately calculating the position of the correction target point regarding the horizontal direction.

According to the projection display device of this application example of the invention, when obtaining the pitch angle $\theta_0$, which is one of the projection angles, the correction pitch angle $\theta_1$ is calculated as the second parameter, and it becomes possible to uniquely calculate the approximate correction target point in the horizontal direction based on the second parameter.

APPLICATION EXAMPLE 7

This application example of the invention is directed to the projection display device of Application Examples 1 of the invention, wherein the image has a rectangular projection area.

According to the projection display device of this application example of the invention, if the projection panel as the light valve provided to the projection display device has a rectangular shape, the rectangular area can be used.

APPLICATION EXAMPLE 8

This application example of the invention is directed to the projection display device of Application Example 7 of the invention, wherein the parameter calculation section calculates the correction target point corresponding to the vanishing point regarding the horizontal direction taking a condition that an extended line of an upper side of the image passes through the correction target point corresponding to the vanishing point regarding the horizontal direction, which is calculated when it is assumed that the limiting condition does not exist, and the correction target point corresponding to the vanishing point in the horizontal direction, which is calculated approximately, is located on the extended line, as a second limiting condition in addition to a first limiting condition corresponding to the limiting condition described in the second aspect.

According to the projection display device of this application example of the invention, since the upper side of the image passes through the correction target point regarding the horizontal direction calculated when assuming that the limiting condition does not exist, the upper side of the image on which the keystone correction process has been performed can be projected as a rectangle substantially parallel to the x-axis.

APPLICATION EXAMPLE 9

This application example of the invention is directed to the projection display device of Application Examples 1 of the invention, wherein an imaging section capable of taking an image of the projection surface including the projection image displayed by projection by the projection display device is further provided, and the actual zoom ratio obtaining section includes a measuring point projection section adapted to display a measuring image by projection, the measuring image including a measuring point for calculating the actual zoom ratio, so that the measuring point is displayed at a position with an offset from the light axis of the projection light projected by the projection section, a projection measuring point detection section adapted to image a projection measuring point, which is the measuring point displayed by projection, with the imaging section, and to detect the projection measuring point based on an image of the projection measuring point on a taken image taken by the imaging section, and an actual zoom ratio determination section adapted to obtain position information of the projection measuring point detected, and to determine the actual zoom ratio using the position information and a previously prepared correspondence between the zoom ratio and the position information.

According to the projection display device of this application example of the invention, it is not required for the user to manually input the value corresponding to the actual zoom ratio into the projection display device.

APPLICATION EXAMPLE 10

This application example of the invention is directed to a keystone correction method for a projection display device which projects an image on a projection surface, including the steps of (a) obtaining a first parameter corresponding to a projection angle showing a relative posture of the projection display device to the projection surface, (b) calculating a position of a vanishing point in displaying the image by projection on the projection surface with the projection angle, based on the first parameter, (c) obtaining an actual zoom ratio at which the projection section actually displays the image by projection on the projection surface, (d) correcting the first parameter based on a fixed reference zoom ratio and the actual zoom ratio to thereby calculate a second parameter, and (e) performing a keystone correction of the image based on the fixed reference zoom ratio and the second parameter.

According to the keystone correction method of this application example of the invention, since the first parameter is corrected to the second parameter, the keystone correction corresponding to the actual zoom ratio can be performed using the keystone correction section for performing the keystone correction assuming that the zoom ratio of the optical system is the fixed reference zoom ratio.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Embodiments of the invention will hereinafter be explained based on some application examples with reference to the accompanying drawings.

A. Embodiment

A1. Hardware Configuration of Projector

Figure 1:
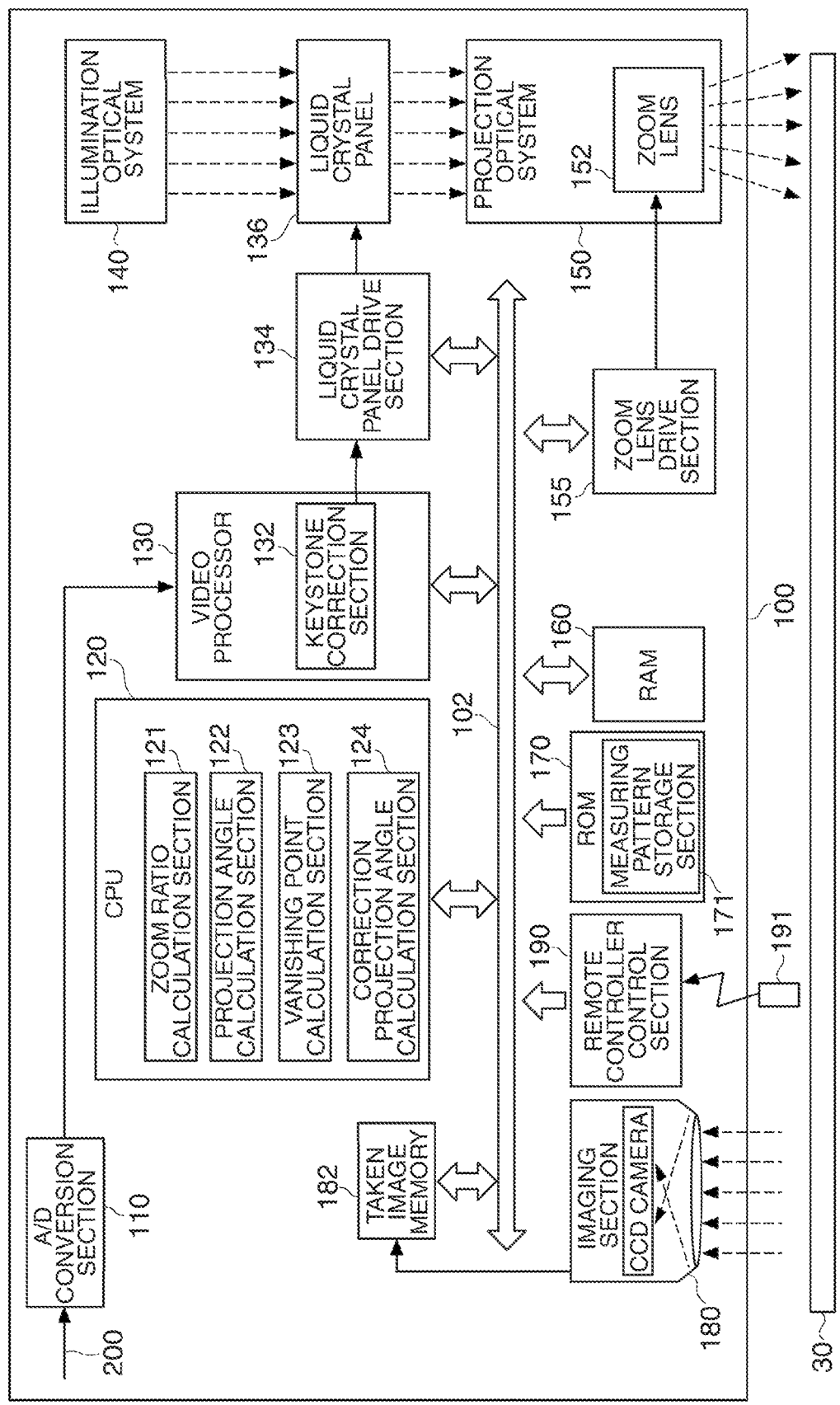
FIG. 1 is a block diagram showing a configuration of a projector according to a first embodiment.

FIG. 1 is a block diagram schematically showing a configuration of a projector 100 as a projection display device according to an embodiment of the invention. The projector 100 projects image light representing an image, thereby displaying the image (hereinafter referred to as a display image) on a projection surface such as a screen 30. It should be noted that the screen 30 has a rectangular shape in the present embodiment.

The projector 100 is provided with a CPU 120, a ROM 170, and a RAM 160. Further, the projector 100 is provided with an analog/digital conversion section (an A/D conversion section) 110, a video processor 130, a liquid crystal panel drive section 134, an illumination optical system 140, a liquid crystal panel 136, a projection optical system 150, a zoom lens drive section 155, an imaging section 180, a taken image memory 182, and a remote controller control section 190. These components are connected to each other with an internal bus 102.

The A/D conversion section 110 converts an analog video signal input to the projector 100 into a digital video signal. The video processor 130 is a processor dedicated to image processing for performing processes such as a keystone correction process, a gamma correction process, and a color conversion process, and a digital signal processor (DSP) can be used therefor, for example. The video processor 130 is provided with a keystone correction section 132 for performing the keystone correction process. The video processor 130 performs the image processes described above on the digital video signal input thereto, and then outputs the digital video signal thus processed to the liquid crystal panel drive section 134. The liquid crystal panel drive section 134 drives the liquid crystal panel 136 based on the digital video signal input thereto. The liquid crystal panel 136 is a transmissive liquid crystal panel for forming an image based on the signals generated by the liquid crystal panel drive circuit 134, and modulates the light emitted from an illumination optical system 140, and then emits the light (the projection light) necessary for projection toward the screen 30. It should be noted that the liquid crystal panel 136 can be a light valve using a reflective liquid crystal panel or a digital micromirror device instead of the transmissive liquid crystal panel. The projection optical system 150 is provided with a zoom lens 152 for projecting the projection light, which is emitted from the illumination optical system 140 and enters via the liquid crystal panel 136, to the screen 30 in an enlarged manner. The zoom lens 152 is translated in parallel by the zoom lens drive section 155 in the light axis direction of the projection light to thereby control the magnification ratio of the projection image displayed on the screen 30 by projection. It should be noted that the illumination optical system 140, the liquid crystal panel 136, the projection optical system 150 correspond to the projection section.

The CPU 120 is provided with a control function for performing overall control of the projector 100, and is further provided with a function as a zoom ratio calculation section 121, a projection angle calculation section 122, a vanishing point calculation section 123, and a correction projection angle calculation section 124 in addition thereto in the present embodiment. These functional sections will be explained later in detail.

A2. Relationship Between Projector and Screen

Figure 2:
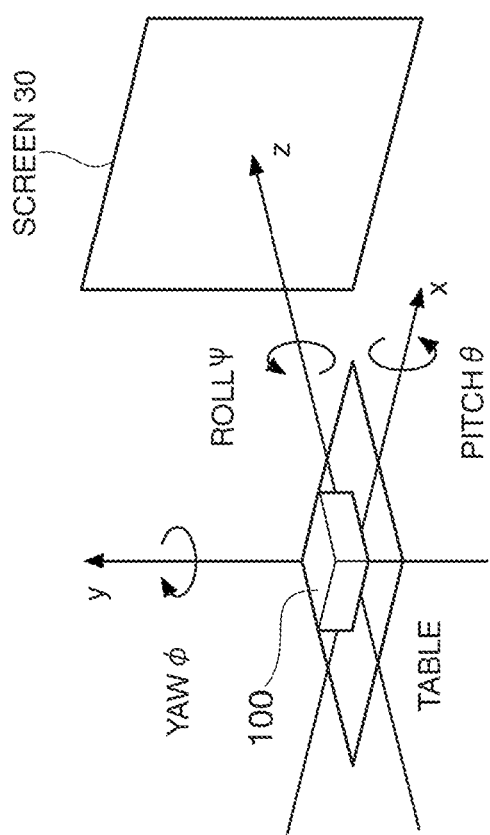
FIG. 2 is an explanatory diagram for explaining the relative positional relationship between the projector and the screen.

Then, a relative positional relationship between the projector and the screen will be explained. FIG. 2 is an explanatory diagram for explaining the relative positional relationship between the projector 100 and the screen 30. In FIG. 2, there is shown an xyz coordinate system. The xyz coordinate system is a coordinate system based on the screen 30. The z-axis is an axis parallel to the normal line of the screen 30. The x-axis is perpendicular to the z-axis, and is parallel to a horizontal direction. In other words, the x-axis is an axis parallel to a horizontal side of a rectangular image, which ought to be projected on the screen 30. The y-axis is perpendicular to the z-axis, and is parallel to a vertical direction. In other words, the y-axis is an axis parallel to a vertical side of the rectangular image, which ought to be projected on the screen 30. The origin of the xyz coordinate system is set to be a principal point of the projection optical system, namely a principal point of the zoom lens 152 in the present embodiment.

As shown in FIG. 2, a rotational angle (a pitch angle) of the projector 100 around the x-axis is denoted as $\theta$. It is defined that the rotational angle $\theta$ takes a positive value when the projector 100 is directed upward. The rotational angle (a yaw angle) of the projector 100 around the y-axis is denoted as $\phi$. It is defined that the rotational angle $\phi$ takes a positive value when the projector 100 is tilted rightward from the posture facing straight the screen 30. The rotational angle (a roll angle) of the projector 100 around the z-axis is denoted as $\psi$. It is defined that the rotational angle $\psi$ takes a positive value when the projector 100 is rotated counterclockwise while viewing the screen 30 from the projector 100 as an opposed surface. The correction of the tilt in the roll angle of the projector 100 is an element, which can also be adjusted by the user manually with ease. Therefore, in the present embodiment, explanation will be presented assuming that the roll angle ψ is equal to zero degree.

In the case in which at least one of the two rotational angles (hereinafter referred to as "projection angles") θ, φ of the projector 100 takes a significant value (a value other than zero), namely the optical axis (i.e., the central axis of the projection optical system) of the projector 100 and the normal line (the z-axis) of the screen 30 do not match each other, the tilted projection is realized.

In the case of realizing the tilted projection, when an image without distortion is formed on the liquid crystal panel 136, the image displayed on the screen is distorted. In contrast, when a distorted image (a corrected image) is formed on the liquid crystal panel 136, an image without distortion, namely an image (a regular image) having a rectangular shape with a correct aspect ratio, can be displayed on the screen.

Figure 3A:
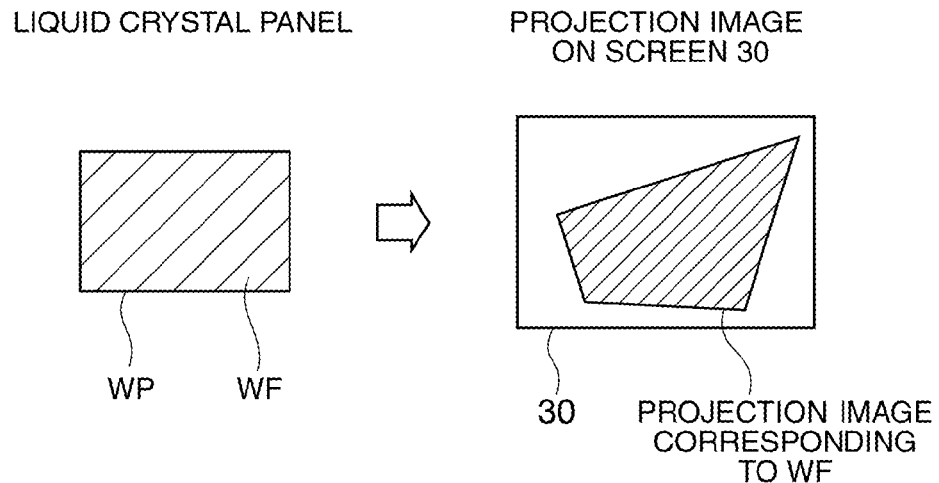
FIGS. 3A and 3B are explanatory diagrams for explaining a relationship between an image formed on a liquid crystal panel and a projection image on a screen in the case of the tilted projection.
Figure 3B:
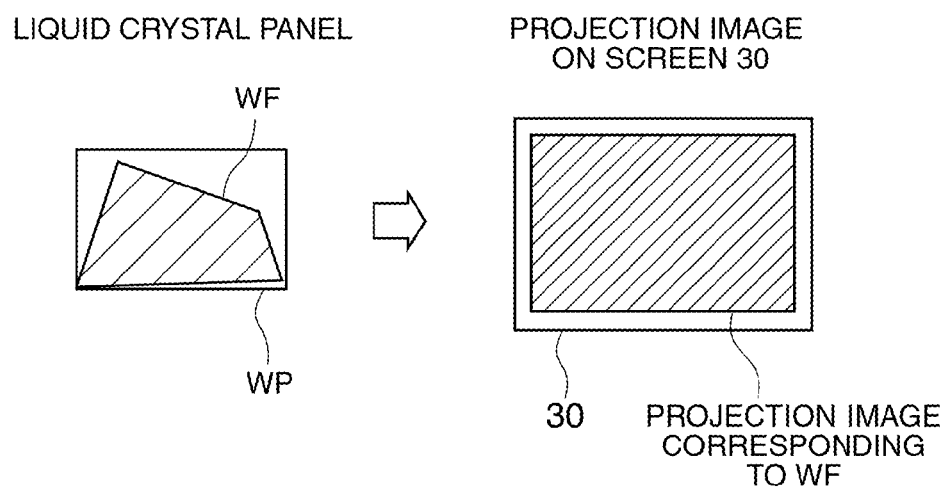

FIGS. 3A and 3B are explanatory diagrams for explaining the relationship between an image formed on the liquid crystal panel 136 and the projection image displayed on the screen 30 in the case in which the tilted projection is realized. FIG. 3A shows that an image without distortion is formed on the liquid crystal panel 136, and the projection image distorted is displayed on the screen 30. In order for simplifying the calculation process, it is assumed that the screen 30 is disposed on a plane expressed in the xyz coordinate system shown in FIG. 2 by z=1. FIG. 3B shows that a distorted image (a corrected image) is formed on the liquid crystal panel 136, and a projection image (a regular image) without distortion is displayed on the screen 30. The symbol WP shown in the drawing denotes a rectangular reference area corresponding to the liquid crystal panel 136. Further, the symbol WF denotes an image forming area where an image is actually formed based on the image data input to the projector 100 within the reference area WP of the liquid crystal panel 136. As described above, in the case of the tilted projection, if the image forming area WF is set to have the same shape as that of the reference area WP of the liquid crystal panel 136, the projection image projected on the screen 30 is problematically distorted. Therefore, in the present embodiment, in order for displaying the projection image by projection, which corresponds to the image data input thereto, on the screen 30 as a regular image with a correct aspect ratio, the keystone correction process is performed by correcting the shape of the image forming area WF with respect to the reference area WP. Hereinafter, the keystone correction process will be explained.

A3. Keystone Correction Process

Figure 4:
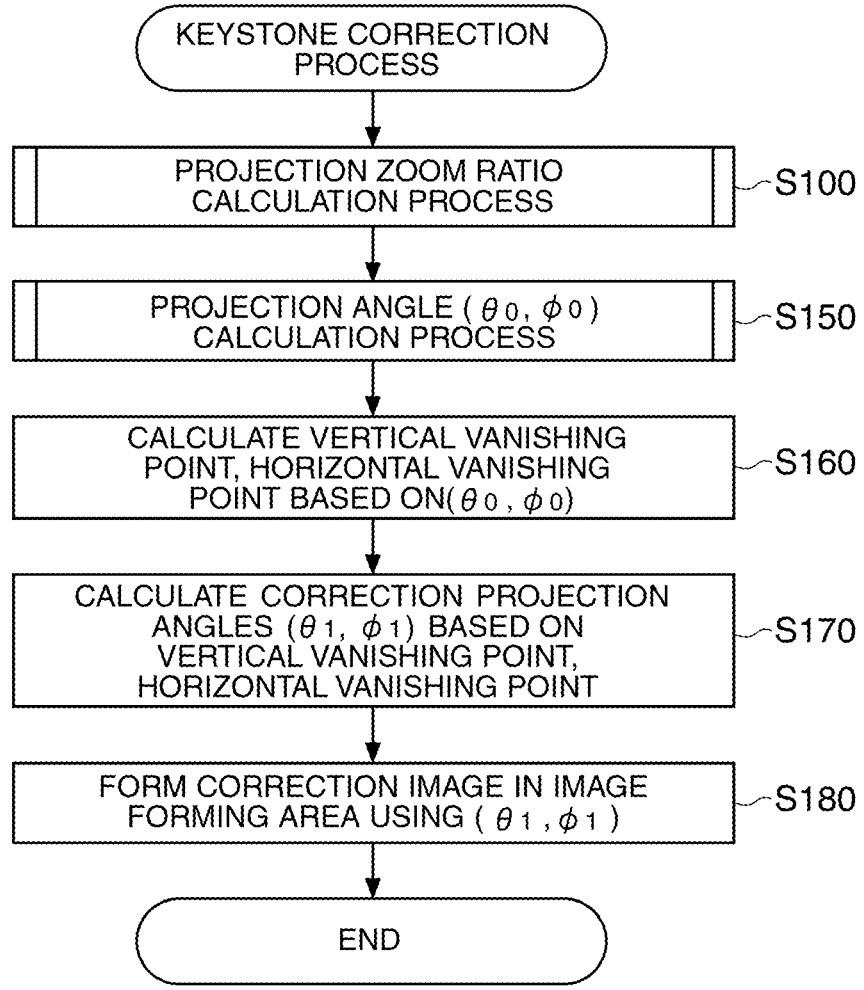
FIG. 4 is a flowchart showing flow of the keystone correction process.

Then, the keystone correction process performed by the projector 100 will be explained. FIG. 4 is a flowchart showing the flow of the keystone correction process performed by the projector 100. The keystone correction process is started in response to the user operating an "automatic keystone correction process button" provided to the remote controller 191. It should be noted that it is also possible to arrange that the keystone correction process is executed automatically in response to powering ON of the projector 100 or input of the image signal.

When the keystone correction process is started, the CPU 120 starts (step S100) an actual zoom ratio calculation process for obtaining the value of an actual zoom ratio $Z_0$, which is a zoom ratio adjusted in the actual projection operation, in the projector 100. The actual zoom ratio $Z_0$ is a zoom ratio at which the projection section actually displays the image by projection on the projection surface. The actual zoom ratio calculation process is performed as a subroutine in the keystone correction process. It should be noted that in the present embodiment, the zoom ratio actually used for the projection, and a zoom ratio previously stored in the projector 100 as an initial setting are used as the zoom ratio. Therefore, for the sake of convenience of explanation, the zoom ratio adjusted in the actual projection operation is called a "actual zoom ratio $Z_0$," and the zoom ratio previously stored in the projector 100 as the initial setting is called a "reference zoom ratio $Z_1$" in order for distinguishing the two zoom ratios described above from each other. The reference zoom ratio $Z_1$ is a fixed zoom ratio.

The actual zoom ratio $Z_0$ can be obtained by the zoom ratio calculation section 121 projecting a measurement image for calculating the zoom ratio on the screen 30, and then analyzing the taken image obtained by the imaging section 180 taking the measurement image thus displayed by projection, or it is also possible that the projector 100 is provided with sensors for detecting the actual zoom ratio $Z_0$ in the zoom lens 152 and the zoom lens drive section 155 to thereby obtain the value of the actual zoom ratio $Z_0$. In the present embodiment, there is adopted the method of obtaining the actual zoom ratio $Z_0$ by displaying the measurement image for calculating the actual zoom ratio on the screen 30 by projection, and then taking the measurement image. It should be noted that the method of obtaining the actual zoom ratio $Z_0$ using the measurement image will be explained later in detail.

When obtaining the value of the actual zoom ratio $Z_0$, the CPU 120 starts (step S150) the projection angle calculation process for calculating the projection angles, which are relative angles between the projector 100 and the screen 30, namely the pitch angle $\theta_0$ and the yaw angle $\phi_0$, as a function of the projection angle calculation section 122. The projection angle calculation process is performed as a subroutine in the keystone correction process. In the projection angle calculation process, an image (hereinafter also referred to as a projection angle measuring image) including three or more measuring points for measuring the projection angles is displayed on the screen 30 by projection as the projection image, and then the screen 30 on which the projection angle measuring image is displayed is imaged by the imaging section 180. It should be noted that the three measuring points on the projection angle measuring image are arranged at positions not existing on the same straight line when the three points are projected on the screen 30.

The CPU 120 detects the three-dimensional coordinates of the three measuring points for measuring the projection angles based on the taken image thus obtained. As the three-dimensional coordinate system, a lens coordinate system (the z-axis represents the light axis of the projection light beam) taking the principal point of the zoom lens 152 as the origin is used. For the detection of the three-dimensional coordinates of the measuring points, a method of detecting a three-dimensional coordinate generally known to the public is used. Specifically, it is performed by an active stereo method, which is of an active type for detecting a three-dimensional coordinate, using the taken image based on the principle of the triangulation utilizing parallax between the zoom lens 152 and the imaging section 180. It should be noted that the method used for the detection of the three-dimensional coordinates of the measuring points can be a three-dimensional coordinate detection method (e.g., a passive stereo method using a plurality of cameras) other than the active stereo method.

After detecting the three-dimensional coordinates of the measuring points, the expression of an approximate plane passing through the three points in the lens coordinate system is calculated using the coordinates of the three points. After obtaining the approximate plane, the projection angles ($\theta_0$, $\phi_0$) are obtained by calculating the angle formed between the light axis (the z-axis of the lens coordinate system) of the projection light and the approximate plane. After obtaining the projection angles ($\theta_0$, $\phi_0$), the CPU 120 subsequently calculates (step S160) a vertical vanishing point and a horizontal vanishing point using the projection angles ($\theta_0$, $\phi_0$). It should be noted that the projection angles ($\theta_0$, $\phi_0$) and the parameters corresponding thereto correspond to the first parameter, and the projection angle calculation section 122 corresponds to the parameter obtaining section.

Figure 5A:
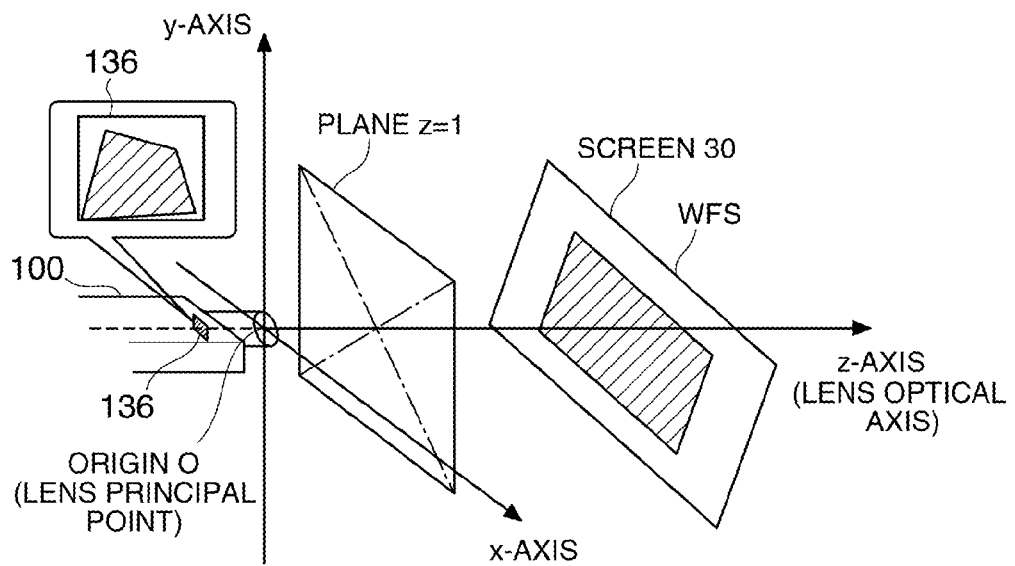
FIGS. 5A and 5B are explanatory diagrams for explaining vanishing points.
Figure 5B:
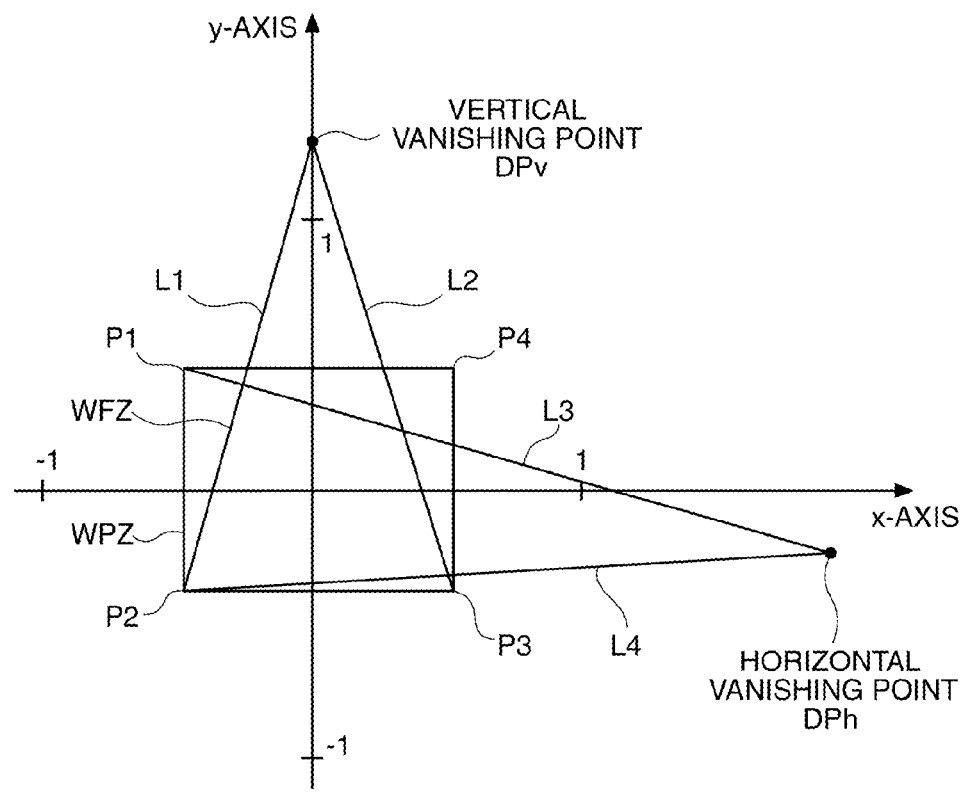

Here, the vanishing point will be explained. Arbitrary straight lines parallel to each other in the three-dimensional space are not parallel to each other in the perspective projection thereof on a plane in some cases, and intersect with each other in those cases. The intersection is called a vanishing point. The vanishing point will hereinafter be explained with a specific example. FIGS. 5A and 5B are explanatory diagrams for explaining the vanishing point. FIG. 5A shows the projector 100 and the screen 30 in the case in which the projector 100 performs the tilted projection on the screen 30. FIG. 5A shows them based on the lens coordinate system taking the principal point of the zoom lens of the projector 100 as the origin O. FIG. 5A further shows a plane (the plane of z=1) perpendicular to the z-axis. In the case of the present specific example, the image forming area WF formed on the liquid crystal panel 136 is displayed on the screen 30 by projection. Further, the projection image (hereinafter, the projection image corresponding to the image forming area is also referred to as a projection image forming area WFS) corresponding to the image forming area displayed on the screen 30 by projection is an image (a regular image) having a rectangular shape with the upper side and the lower side parallel to each other, and the right side and the left side parallel to each other.

FIG. 5B shows the perspective projection (intersecting lines of planes, which pass through the respective sides of the projection image forming area WFS on the screen 30 and the origin O, and the plane z=1) of the projection image forming area WFS to the plane z=1. It should be noted that the coordinate system shown in FIG. 5B is called a standard coordinate system of the lens coordinate system. The unit of the standard coordinate system represents the directions of plus 45 degrees and minus 45 degrees as plus 1 and minus 1, respectively. Since the right side and the left side of the projection image forming area WFS are parallel to each other in the lens coordinate system, the straight lines obtained by extending the right side and the left side of the projection image forming area WFS (hereinafter also referred to as a projective image forming area WFZ) projected in a perspective manner to the standard coordinate system intersect with each other at a point. The point is called a vertical vanishing point DPv. Similarly, since the upper side and the lower side of the projection image forming area WFS in the lens coordinate system are parallel to each other, the straight lines obtained by extending the upper side and the lower side of the projective image forming area WFZ intersect with each other at a point. The point is called a horizontal vanishing point DPh. Further, the rectangular image surrounding the projective image forming area WFZ denotes an area (hereinafter also referred to as a projective reference area WPZ) obtained by performing a projective transformation on the reference area WP of the liquid crystal panel 136 to the standard coordinate system. In the case of correcting the distortion of the projection image due to the tilted projection, the projective image forming area WFZ is determined based on the projective reference area WPZ and the vanishing points (the vertical vanishing point DPv and the horizontal vanishing point DPh), thereby performing the correction. For example, as shown in FIG. 5B, the distortion of the projection image due to the tilted projection can be corrected by determining the area surrounded by four straight lines (L1 through L4), namely two lines L1, L2 passing through the vertical vanishing point DPv and the apexes P2, P3, respectively, on the lower side of the projective reference area WPZ, and two straight lines L3, L4 passing through the horizontal vanishing point DPh and the apexes P1, P2, respectively, on the left side (if $\phi$>0) of the projective reference area WPZ, as the projective image forming area WFZ, and then forming the image forming area WF corresponding to the projective image forming area WFZ on the liquid crystal panel 136. It should be noted that in the explanation described below the vertical vanishing point DPv and the horizontal vanishing point DPh are also referred to collectively as vanishing points DP.

The positions (coordinates) of the vanishing points DP (the vertical vanishing point DPv and the horizontal vanishing point DPh) are uniquely determined based on the relative angles (the pitch angle $\theta$, the yaw angle $\phi$, and the roll angle $\psi$) between the screen 30 and the projector 100. The coordinates of the vanishing points DP of the lens coordinate system in the standard coordinate system are expressed as the formulas 1 and 2 below.

Formula 1

$$DPv = \left( \frac{\sin\psi \cdot \cos\phi}{\sin\psi \cdot \sin\phi \cdot \cos\theta + \cos\psi \cdot \sin\theta}, \frac{-\sin\psi \cdot \sin\phi \cdot \sin\theta + \cos\psi \cdot \cos\theta}{\sin\psi \cdot \sin\phi \cdot \cos\theta + \cos\psi \cdot \sin\theta} \right) \quad (1)$$

Formula 2

$$DPh = \left( \frac{\cos\psi \cdot \cos\phi}{\cos\psi \cdot \sin\phi \cdot \cos\theta - \sin\psi \cdot \sin\theta}, \frac{-\cos\psi \cdot \sin\phi \cdot \sin\theta - \sin\psi \cdot \cos\theta}{\cos\psi \cdot \sin\phi \cdot \cos\theta - \sin\psi \cdot \sin\theta} \right) \quad (2)$$

It should be noted that the correction of the tilt of the projector 100 in the roll angle $\psi$ direction is an element, which can easily be adjusted by the user, and the roll angle $\psi$=0 is assumed in the present embodiment. And in the case of the roll angle $\psi$=0, the coordinates of the vanishing points DP in the standard coordinate system of the lens coordinate system are expressed as the formulas 3 and 4 below.

Formula 3

$$DPv = \left( 0, \frac{1}{\tan\theta} \right) \quad (3)$$

Formula 4

$$DPh = \left( \frac{1}{\tan\phi \cdot \cos\theta}, -\tan\theta \right) \quad (4)$$

Utilizing the calculation method of the vanishing points described above, the CPU 120 calculates (step S160 in FIG. 4) the vertical vanishing point DPv and the horizontal vanishing point DPh using the projection angles ($\theta_0$, $\phi_0$). The reference zoom ratio $Z_1$ previously defined in the production step is set in the projector 100 as a zoom ratio parameter, which is a parameter corresponding to the zoom ratio. The reference zoom ratio $Z_1$ is a zoom ratio conceivable to have the highest use frequency in ordinary use. Since the projector 100 calculates the image forming area WF based on the reference zoom ratio $Z_1$ even while projecting an image on the screen 30 with the actual zoom ratio $Z_0$, which is a zoom ratio adjusted by the user, the picture projected on the screen 30 does not become rectangular if the image forming area WF is calculated using the vanishing points, which are calculated based on the projection angles ($\theta_0$, $\phi_0$) using the method described above, without modification. Therefore, the coordinates of the vanishing points are corrected.

The difference between the case of calculating the image forming area based on the reference zoom ratio $Z_1$ and the case of calculating the image forming area based on the actual zoom ratio $Z_0$ is, as explained with reference to FIG. 5A, that the image corresponding to the projection image forming area WFS, namely the size of the projective image forming area WFZ is different therebetween when the projection image forming area WFS, which is an image corresponding to the image forming area displayed by projection on the screen 30, is projected in a perspective manner to the standard coordinate system, namely when the projection image forming area WFS is projected to the plane z=1 in a perspective manner. Therefore, in the tilted projection with the projection angles ($\theta_0$, $\phi_0$), the shape of the image forming area in the standard coordinate system is different between the case of calculating the image forming area based on the reference zoom ratio $Z_1$ and the case of calculating the image forming area based on the actual zoom ratio $Z_0$. As described above, the projector is programmed so as to calculate the image forming area based on the reference zoom ratio $Z_1$. Therefore, in the projector 100 according to the embodiment of the invention, the projection angles ($\theta$, $\phi$) are corrected so that the shape of the image forming area calculated based on the reference zoom ratio $Z_1$ becomes the most similar to the shape obtained by performing similar extension/shrinkage on the image forming area calculated using the projection angles ($\theta_0$, $\phi_0$) and the actual zoom ratio $Z_0$. The detailed explanation thereof will hereinafter be presented with reference to FIGS. 6A through 6C. It should be noted that the explanation will be presented in the present embodiment assuming "(the actual zoom ratio $Z_0$)<(the reference zoom ratio $Z_1$)."

Figure 6A:
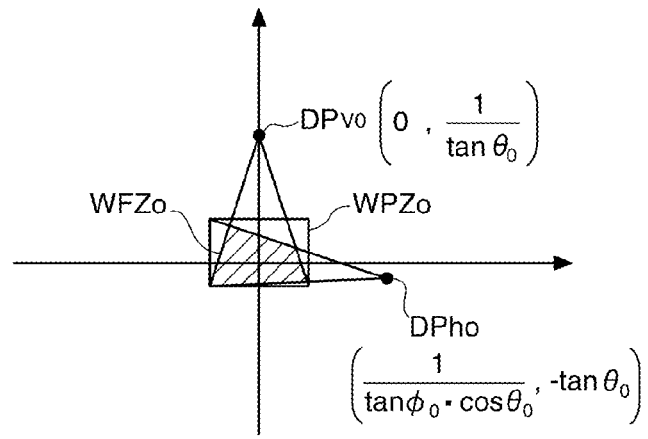
FIGS. 6A through 6C are explanatory diagrams for explaining a relationship between the zoom ratio and the vanishing points in the tilted projection with projection angles ($\theta_0$, $\phi_0$).
Figure 6B:
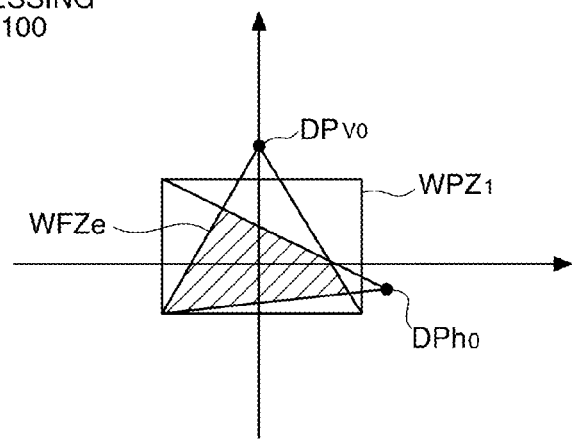
Figure 6C:
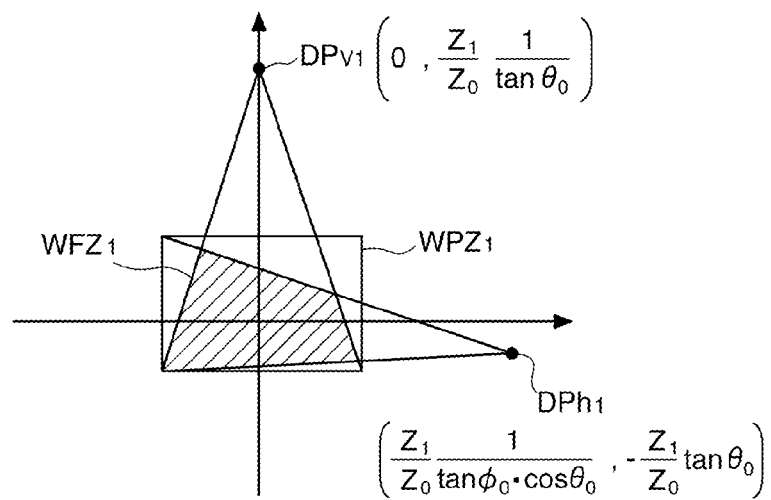

FIGS. 6A through 6C are explanatory diagrams for explaining a relationship between the zoom ratio and the vanishing points in the tilted projection with the projection angles ($\theta_0$, $\phi_0$). FIG. 6A shows the vertical vanishing point $DPv_0$ and the horizontal vanishing point $DPh_0$, and the projective reference area $WPZ_0$ and the projective image forming area $WFZ_0$ in the standard coordinate system in the case in which the zoom ratio is equal to the actual zoom ratio $Z_0$. In the case of FIG. 6A, the coordinates of the vertical vanishing point $DPv_0$ and the horizontal vanishing point $DPh_0$ are expressed as the formula 5 and the formula 6 below.

Formula 5
$$DPv_0 = \left(0, \frac{1}{\tan\theta_0}\right) \qquad (5)$$

Formula 6
$$DPh_0 = \left(\frac{1}{\tan\phi_0 \cdot \cos\theta_0}, -\tan\theta_0\right) \qquad (6)$$

However, as described above, the projector 100 is set on the program so as to calculate the projective image forming area WFZ assuming that the zoom ratio is equal to reference zoom ratio $Z_1$, also while performing the projection with the actual zoom ratio $Z_0$. FIG. 6B shows the case in which the vanishing points are calculated when the projector 100 performs the projection with the actual zoom ratio $Z_0$, and then the projective image forming area WFZ is determined using the vanishing points. In this case, the coordinates of the vanishing points are obtained as the vertical vanishing point $DPv_0$ and the horizontal vanishing point $DPh_0$ shown in FIG. 6A. However, the projective reference area WPZ becomes the projective reference area $WPZ_1$ corresponding to the reference zoom ratio $Z_1$. Therefore, if the projective image forming area WFZe is determined based on the vertical vanishing point $DPv_0$, the horizontal vanishing point $DPh_0$, and the projective reference area $WPZ_1$, the image displayed on the screen 30 by projection becomes to have a distorted shape.

Therefore, the projector 100 according to the embodiment of the invention performs a process for calculating correction target points obtained by correcting the vanishing points DP so that the projection image projected thereon with the actual zoom ratio $Z_0$ becomes to have a rectangular shape, and then correcting the projection angles ($\theta_0$, $\phi_0$) based on the correction target points thus obtained. For the sake of convenience of the calculation process, the position of one (the vertical correction target point $DPv_1$ in the present embodiment) of the vertical correction target point $DPv_1$ corresponding to the vertical vanishing point $DPv_0$ and the horizontal correction target point $DPh_1$ corresponding to the horizontal vanishing point $DPh_0$ can be calculated correctly, and the position of the other (the horizontal correction target point $DPh_1$ regarding the present embodiment) thereof can be calculated approximately.

FIG. 6C shows the vertical correction target point $DPv_1$ and the horizontal correction target point $DPh_1$, and the projective reference area $WPZ_1$ and the projective image forming area $WFZ_1$ in the standard coordinate system in the case in which the zoom ratio is equal to the reference zoom ratio Z. In the case shown in FIG. 6C, since the zoom ratio is changed to the reference zoom ratio $Z_1$ from the actual zoom ratio $Z_0$ compared to the case shown in FIG. 6A, the coordinates of the vertical correction target point $DPv_1$ and the horizontal correction target point $DPh_1$ are obtained as the formulas 7 and 8 below.

Formula 7
$$DPv_1 = \left(0, \frac{Z_1}{Z_0}\frac{1}{\tan\theta_0}\right) \qquad (7)$$

Formula 8
$$DPh_1 = \left(\frac{Z_1}{Z_0}\frac{1}{\tan\phi_0 \cdot \cos\theta_0}, -\frac{Z_1}{Z_0}\tan\theta_0\right) \qquad (8)$$

Incidentally, the human eyesight has a tendency that, in comparison between the case in which the viewing object is distorted in a horizontal direction and the case in which the viewing object is distorted in a vertical direction, the horizontal distortion is viewed with higher sensitivity. Therefore, in the present embodiment, in order for making the vertical sides of the projection image, namely the left side and the right side thereof, substantially parallel to each other, the vertical correction target point $DPv_1$ is calculated correctly with priority. Further, regarding the horizontal correction target point $DPh_1$, approximate calculation is performed, and the point thus obtained is called an approximate horizontal correction target point. Hereinafter, the explanation will be presented in a concrete manner.

As described above, while performing the projection with the actual zoom ratio $Z_0$, the projector 100 performs the distortion correction process for the projection image using the reference zoom ratio $Z_1$ as the zoom ratio parameter. Regarding the vertical correction target point $DPv_1$, calculation is performed correctly. Regarding the horizontal correction target point $DPh_1$, the point (hereinafter also referred to as an approximate horizontal correction target point $DPh_1'$) calculated approximately is obtained. Then, the process for correcting the projection angles $(\theta_0, \phi_0)$ calculated by the projection angle calculation process (see step S150 in FIG. 4), namely the actual projection angles, based on the vertical correction target point $DPv_1$ and the approximate horizontal correction target point $DPh_1'$ thus obtained to thereby newly calculate the correction projection angles $(\theta_1, \phi_1)$ is performed (step S170 in FIG. 4).

Hereinafter, the process for calculating the correction projection angles $(\theta_1, \phi_1)$ will be explained.

Figure 7A:
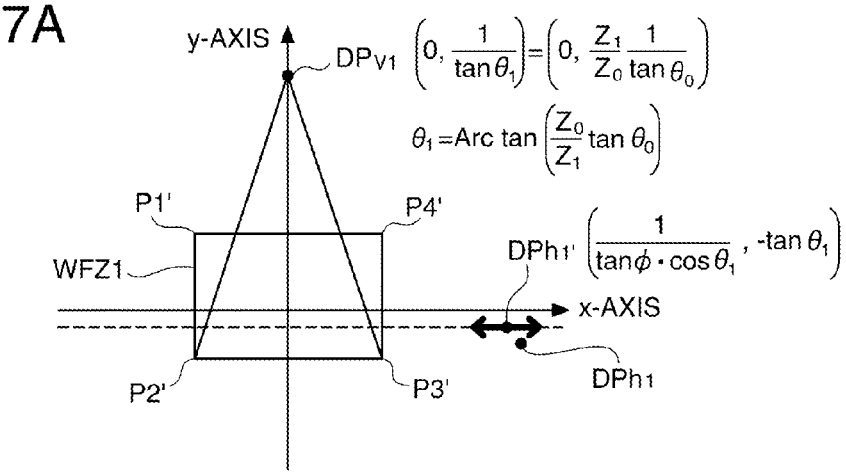
FIGS. 7A through 7C are explanatory diagrams for explaining a calculation process of correction projection angles ($\theta_1$, $\phi_1$).
Figure 7B:
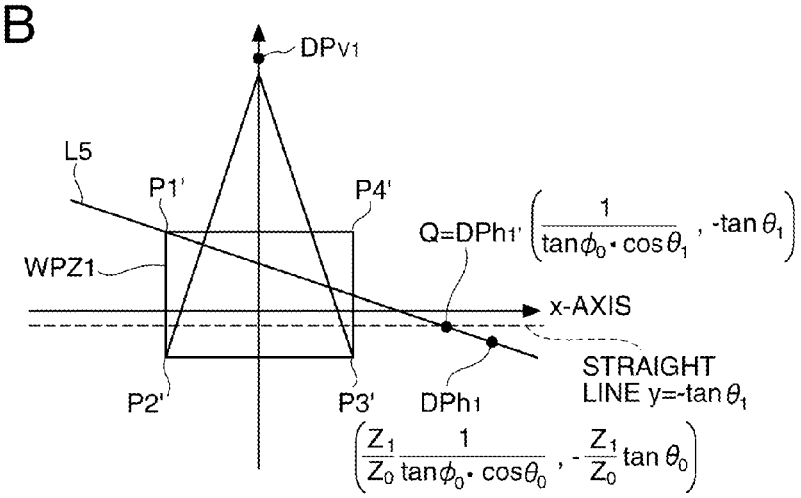
Figure 7C:
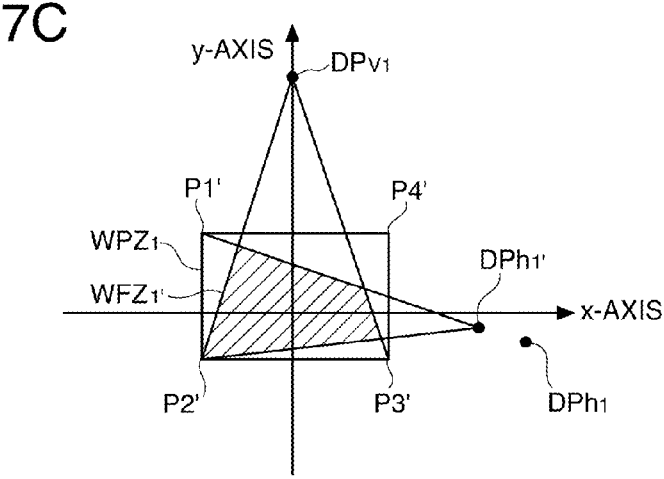

FIGS. 7A through 7C are explanatory diagrams for explaining the calculation process of correction projection angles $(\theta_1, \phi_1)$. As shown in FIG. 7A, based on the coordinate representing the vertical correction target point $DPv_1$ by performing approximate extension/shrinkage on the coordinate of the vertical vanishing point $DPv_0$ in accordance with a ratio between the actual zoom ratio $Z_0$ and the reference zoom ratio $Z_1$ and the coordinate representing the vertical correction target point $DPv_1$ using the correction projection angles $(\theta_1, \phi_1)$, the formula 9 below can be obtained. Further, according to the formula 9, $\theta_1$ is obtained as the formula 10 below.

Formula 9
$$\left(0, \frac{1}{\tan\theta_1}\right) = \left(0, \frac{Z_1}{Z_0}\frac{1}{\tan\theta_0}\right) \qquad (9)$$

Formula 10
$$\theta_1 = \text{Arctan}\left(\frac{Z_0}{Z_1}\tan\theta_0\right) \qquad (10)$$

In other words, by calculating $\theta_1$ along the formula 10 with respect to $\theta_0$ calculated by the projection angle calculation process, and then calculating the vertical correction target point $DPv_1$ using $\theta_1$, even if the zoom ratio is set to the actual zoom ratio $Z_0$ in the projector 100, the vertical correction target point $DPv_1$ corresponding to the reference zoom ratio $Z_1$ can be calculated as far as the program is concerned.

Then, the approximate horizontal correction target point $DPh_1'$ is calculated. According to the process described above, the correction projection angle $\theta_1$ can be obtained as the pitch angle $\theta$. In other words, since $\theta = \theta_1$ is satisfied, the y-coordinate of the horizontal correction target point $DPh_1$ is fixed as $y = -\tan\theta_1$ using the formula 4, which is a coordinate calculation formula of the horizontal vanishing point. As shown in FIG. 7B, if the y-coordinate of the horizontal correction target point $DPh_1$ to be calculated is fixed as $y = -\tan\theta_1$, the value of the y-coordinate of the correct horizontal correction target point $DPh_1$ cannot be expressed as $\theta = \theta_1$ except the case of $Z_0 = Z_1$. When explaining the above using the mathematical expressions, it is also understood from the fact that the value of $\theta_0$ with which the coordinate obtained by applying $\theta_1$ expressed by the formula 10 to the formula 4 and the coordinate expressed by the formula 8 become identical to each other does not exist except the case of $Z_0 = Z_1$.

Therefore, the point close to the horizontal correction target point $DPh_1$ is calculated as the approximate horizontal correction target point $DPh_1'$, and is used for forming the projective image forming area WFZ. As shown in FIG. 7A, since the angle is fixed to satisfy $\theta = \theta_1$, the y-coordinate of the approximate horizontal correction target point $DPh_1'$ is also fixed. Therefore, the x-coordinate of the approximate horizontal correction target point $DPh_1'$ varies alone in accordance with the value of $\phi$.

Regarding the determination of the value of $\phi$, as shown in FIG. 7B, assuming the intersection between a straight line L5 passing through the apex P1' of the projective reference area $WPZ_1$ and the horizontal correction target point $DPh_1$ and the straight line $y = -\tan\theta_1$ as an intersection Q, the value of $\phi$ is determined as $\phi = \phi_1$ so that the intersection Q and the approximate horizontal correction target point $DPh_1'$ becomes identical to each other. After calculating the approximate horizontal correction target point $DPh_1'$ using the calculation process described above, as shown in FIG. 7C, the shape of the projective image forming area WFZ is determined using the vertical correction target point $DPv_1$ and the approximate horizontal correction target point $DPh_1'$ similarly to the method explained above. Specifically the correction projection angles $(\theta_1, \phi_1)$ are calculated based on the projection angles $(\theta_0, \phi_0)$ obtained by the projection angle calculation process, then the projective image forming area $WFZ_1'$ is determined based on the correction projection angles $(\theta_1, \phi_1)$ thus calculated, and then the distortion of the projection image due to the tilted projection is corrected (step S180) by the projective image forming area $WFZ_1'$ thus obtained. In the projector 100 according to the embodiment of the invention, the distortion of the projection image due to the tilted projection is corrected in the manner as described above. It should be noted that the correction projection angles $(\theta_1, \phi_1)$ and the parameters corresponding thereto correspond to the second parameter, and the correction projection angle calculation section 124 corresponds to the parameter calculation section.

Further, although in FIG. 7B, the intersection Q is assumed to be the intersection between the straight line L5 passing through the apex P1', which is the apex of the upper side of the projective reference area $WPZ_1$ and the horizontal correction target point $DPh_1$ and the straight line $y = -\tan\theta_1$, it is also possible to assume that the intersection Q is an intersection between a straight line L6 (not shown) passing through the apex P2', which is an apex of the lower side of the projective reference area $WPZ_1$, and the horizontal correction target point $DPh_1$ and the straight line $y = -\tan\theta_1$. In the case in which the intersection Q is calculated based on the apex P1' and the straight line L5, then the approximate horizontal correction target point $DPh_1'$ is determined, and then the projective image forming area $WFZ_1'$ is formed as shown in FIG. 7B, since the upper side of the projective image forming area $WFZ_1'$, namely the straight line L5, passes through the horizontal correction target point $DPh_1$ corresponding to the zoom ratio equal to the actual zoom ratio $Z_0$, the upper side of the projection image forming area WFS (see FIG. 5A) projected on the screen 30 becomes substantially parallel to the x-axis in the lens coordinate system. In other words, the angle formed between the left and right sides and the upper side of the projection image forming area WFS becomes roughly 90 degrees. On the other hand, in the case in which the intersection Q is calculated based on the apex P2' and the straight line L6, then the approximate horizontal correction target point $DPh_1'$ is determined, and then the projective image forming area $WFZ_1'$ is formed, since the lower side of the projective image forming area $WFZ_1'$, namely the straight line L6, passes through the horizontal correction target point $DPh_1$ corresponding to the zoom ratio equal to the actual zoom ratio $Z_0$, the lower side of the projection image forming area WFS projected on the screen 30 becomes substantially parallel to the x-axis in the lens coordinate system. In other words, the angle formed between the left and right sides and the lower side of the projection image forming area WFS becomes roughly 90 degrees. It should be noted that the vertical vanishing point $DPv_0$ and the horizontal vanishing point $DPh_0$ correspond to the vanishing point. The vertical correction target point $DPv_1$ and the horizontal correction target point $DPh_1$ correspond to the correction target point, and the approximate horizontal correction target point $DPh_1'$ corresponds to the correction target point calculated approximately. Further, the keystone correction section 132 corresponds to the keystone correction section, and the video processor 130 corresponds to the keystone execution section.

A4. Actual Zoom Ratio Calculation Process

Figure 8:
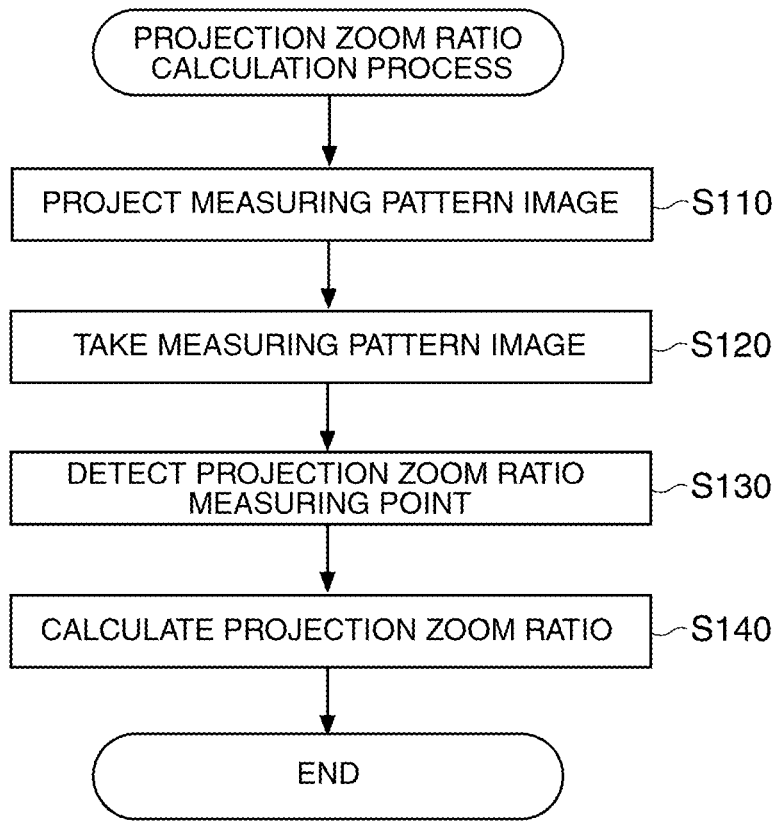
FIG. 8 is a flowchart showing flow of a actual zoom ratio calculation process.

Then, the actual zoom ratio calculation process (step S100 in FIG. 4) will be explained. FIG. 8 is a flowchart showing flow of the actual zoom ratio calculation process. The actual zoom ratio calculation process is performed (see FIG. 4) in sync with the start-up of the keystone correction process in response to an instruction from the user via the remote controller 191 as described above. When the zoom ratio calculation process is started, the CPU 120 projects (step S110) a measuring pattern image for measuring the posture condition of the screen 30 on the screen 30. As a specific processing procedure in the step S110, the CPU 120 transmits the image data representing the measuring pattern image MI, which has previously been stored in a measuring pattern storage section 171 of the ROM 170 as a read-only storage section, to the liquid crystal panel drive section 134. The liquid crystal panel drive section 134 makes the liquid crystal panel 136 form the image representing the measuring pattern image MI in the image forming area WF. Thus, the measuring pattern image MI is displayed on the screen 30 via the projection optical system 150.

Figure 9A:
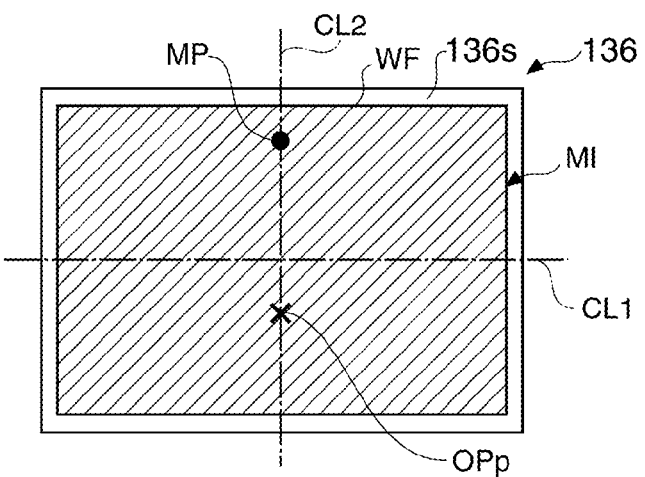
FIGS. 9A through 9C are explanatory diagrams for explaining a method of measuring the actual zoom ratio.

FIG. 9A is an explanatory diagram showing an example of the measuring pattern image MI, and schematically shows the liquid crystal panel 136 having the measuring pattern image MI formed in the image forming area WF thereof. As shown in FIG. 9A, an intersection OPp (hereinafter referred to as a "panel optical axis intersection OPp") between the optical axis of the projection optical system 150 and the panel surface 136s is indicated by the symbol "X." It should be noted that in FIG. 9A, a first center line CL1 passing through the midpoints of respective two short sides of the panel surface 136s opposed to each other and a second center line CL2 passing through the midpoints of respective two long sides of the panel surface 136s opposed to each other are illustrated by dashed lines for the sake of convenience of explanation. MP is a actual zoom ratio measuring point for calculating the actual zoom ratio $Z_1$.

Incidentally, in the projector 100, the optical axis of the projection optical system 150 is provided in advance with an offset downward from the center of the panel surface 136s in order for reducing the distortion of the projection image caused by the fact that the optical axis of the projection optical system 150 has a tilt angle with the projection surface. Specifically, the positions of the projection optical system 150 and the liquid crystal panel 136 are determined so that the panel optical axis intersection OPp is located on the second center line CL2 and lower than the first center line CL1 on the sheet.

Figure 9B:
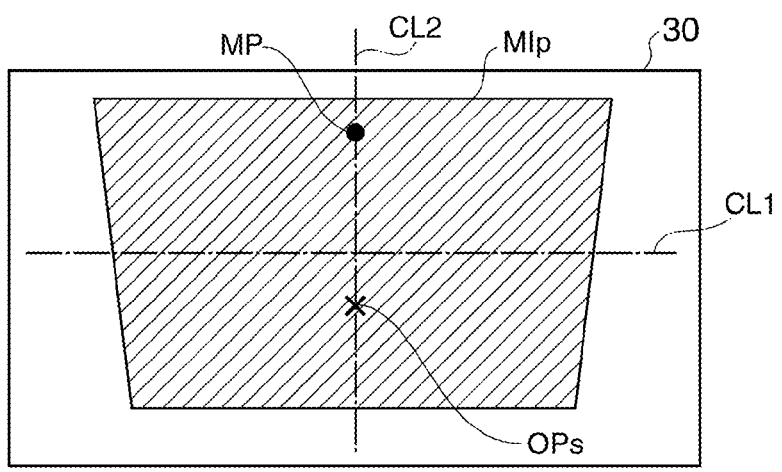

FIG. 9B is a schematic diagram showing the condition in which the measuring pattern image MI shown in FIG. 9A is displayed by projection on the screen 30. Hereinafter, the projection image of the measuring pattern image MI is referred to as a "measuring projection image MIp." The measuring projection image MIp is substantially the same as the measuring pattern image MI shown in FIG. 9A except the point that it is distorted on the projection surface to have a substantially trapezoidal shape. It should be noted that an intersection OPs (hereinafter referred to as a "screen optical axis intersection OPs") between the optical axis of the projection optical system 150 and the projection surface of the screen 30 is indicated by the symbol "×" in FIG. 9B.

Figure 9C:
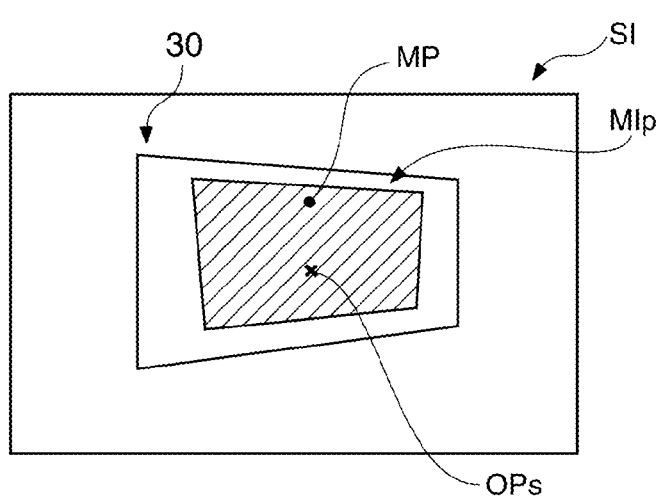

After projecting the measuring pattern image IM on the screen 30 in the step S110 (FIG. 8), the CPU 120 takes (step S120 in FIG. 8) an image of the screen 30 on which the measuring projection image MIp is displayed using the imaging section 180 (FIG. 1). FIG. 9C is a schematic diagram showing the taken image SI taken by the imaging section 180. In the taken image SI, there is reflected the actual zoom ratio measuring point MP. It should be noted that the screen optical axis intersection OPs is indicated by the symbol "X" in FIG. 9C. The imaging section 180 stores the image data (hereinafter referred to as "imaging data") representing the taken image SI into the taken image memory 182.

After storing the imaging data into the taken image memory 182, the CPU 120 reads the imaging data stored in the taken image memory 182. Further, the zoom ratio calculation section 121 of the CPU 120 detects the measuring projection image data MIp reflected in the taken image SI, and at the same time, detects (step S130) the coordinate of the actual zoom ratio measuring point MP in the taken image plane. Specifically, the zoom ratio calculation section 121 detects the actual zoom ratio measuring point MP using the contrast ratio of the image.

Figure 10A:
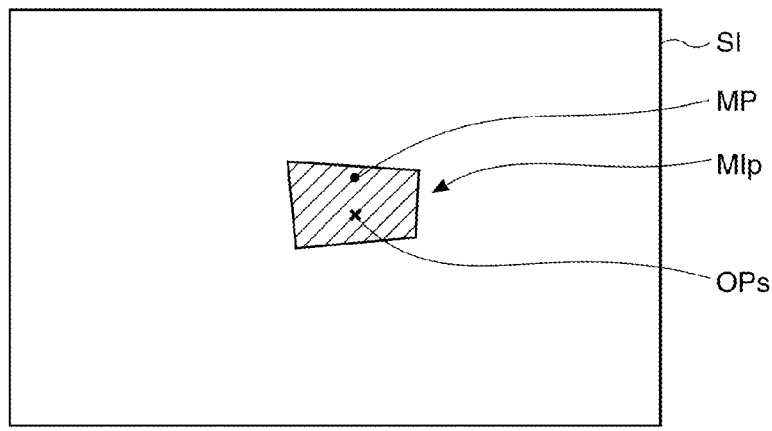
FIGS. 10A through 10C are explanatory diagrams for explaining a relationship between the zoom ratio of a projection optical system and a actual zoom ratio measuring point MP.
Figure 10B:
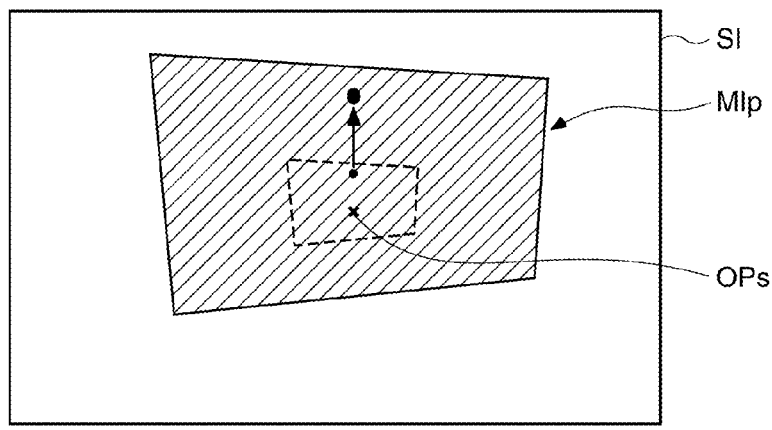

FIGS. 10A, 10B, 10C, and 11 are explanatory diagrams for explaining the relationship between the zoom ratio of the projection optical system 150 and the actual zoom ratio measuring point MP. FIGS. 10A and 10B are schematic diagrams showing the taken image SI obtained by taking the measuring projection image MIp displayed by projection on the screen 30 having the same posture condition when setting the zoom ratio of the projection optical system 150 to be the minimum and the maximum, respectively. FIGS. 10A and 10B are substantially the same as FIG. 9C except the point that the measuring projection images MIp with different display magnifications are shown. Further, in FIG. 10B, the measuring projection image MIp displayed by projection with the minimum magnification is illustrated with broken lines.

As shown in FIGS. 10A and 10B, when the zoom ratio of the projection optical system 150 is varied from the minimum to the maximum, the measuring projection image MIp varies the projection size thereof centering on the screen optical axis intersection OPs. On this occasion, the actual zoom ratio measuring point MP moves linearly in a direction (indicated by the arrow) along which the distance from the screen optical axis intersection OPs increases in accordance with the variation in the zoom ratio.

Figure 10C:
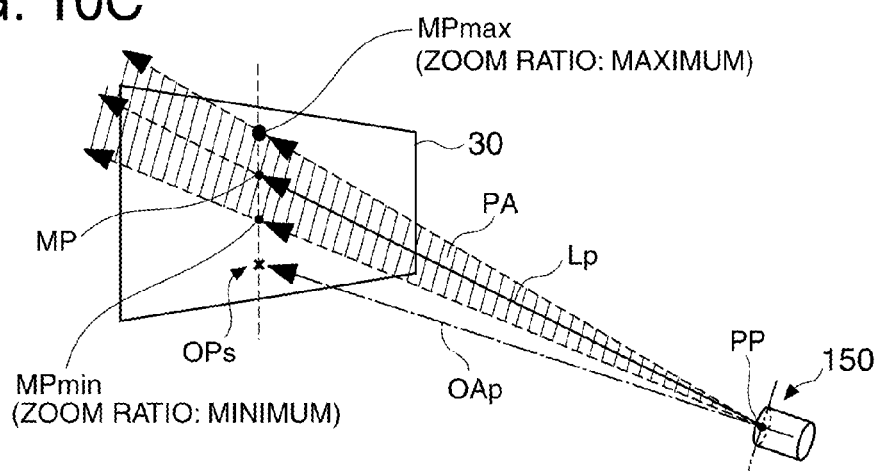

FIG. 10C is a diagram schematically showing the state of the projection optical system 150 projecting the actual zoom ratio measuring point MP on the screen 30. FIG. 10C schematically shows the projection optical system 150, the screen 30, the projection images MPmin, MPmax of the actual zoom ratio measuring point MP with the minimum zoom ratio of the projection optical system 150 and the maximum zoom ratio thereof, respectively. Further, FIG. 10C schematically shows the optical axis OAp of the projection optical system 150 and the screen optical axis intersection OPs. It should be noted that the optical axis OAp is illustrated with a dashed line.

Here, a straight line Lp connecting the principal point PP of the projection optical system 150 and the actual zoom ratio measurement point MP displayed by projection on the screen 30 is considered. The straight line Lp is a trajectory of the image light representing the actual zoom ratio measuring point MP. The straight line Lp as the trajectory of the image light is varied in the tilt around the principal point PP when varying the zoom ratio of the projection optical system 150 from the minimum to the maximum, and thus forming a plane area PA indicated by hatching. In other words, the tilt of the straight line Lp on the plane area PA and the zoom ratio of the projection optical system 150 have a unique relationship. Therefore, if the coordinates in the world coordinate system of the actual zoom ratio measuring point MP displayed on the screen 30 can be specified, it becomes possible to obtain the straight line Lp based on those coordinates and the coordinates of the principal point PP of the projection optical system 150, and thus the zoom ratio of the projection optical system 150 can uniquely be specified.

Figure 11:
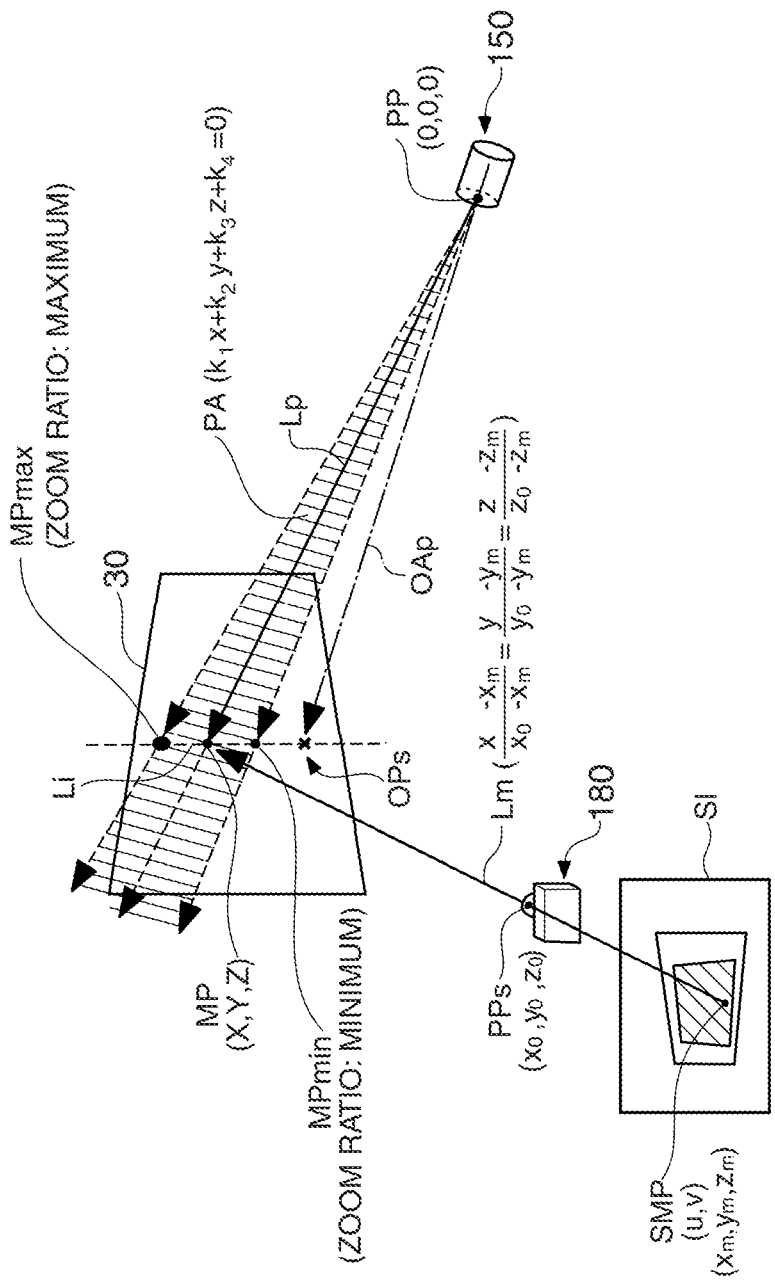
FIG. 11 is an explanatory diagram for explaining a relationship between the zoom ratio of the projection optical system and the actual zoom ratio measuring point MP.

FIG. 11 is a diagram schematically showing the relationship between the taken image SI of the imaging section 180 and the actual zoom ratio measuring point MP thus projected. FIG. 11 is substantially the same as FIG. 10C except the point that the imaging section 180 and the taken image SI thereof are added to FIG. 10C. It should be noted that the taken image SI is shown as an image inverted by the lens of the imaging section 180. Further, in order for distinguishing between the actual zoom ratio measuring point MP displayed by projection on the screen 30 and the actual zoom ratio measuring point MP reflected in the taken image SI, the actual zoom ratio measuring point MP in the taken image SI will be described as the "actual zoom ratio measuring point SMP" in the following explanation.

Here, an imaginary straight line Lm connecting between the principal point PPs of the imaging section 180 and the projection image of the actual zoom ratio measuring point MP on the screen 30 is considered. The straight line Lm passes through the actual zoom ratio measuring point SMP in the taken image SI and the principal point PPs of the imaging section 180. Since the coordinates of the principal point PPs of the imaging section 180 are given, the straight line Lm can be determined based on the coordinates of the actual zoom ratio measuring point SMP in the taken image SI. Here, the actual zoom ratio measuring point MP projected on the screen 30 is a point on the plane area PA. Therefore, the coordinates of the projection image of the actual zoom ratio measuring point MP on the screen 30 can be obtained as an intersection between the imaginary straight line Lm and the plane area PA.

Here, the world coordinate system having the principal point PP of the projection optical system 150 as the origin is considered. As described above, the plane area PA defined by the light beam projecting the actual zoom ratio measuring point MP projected on the screen 30 is given, and the expression of the plane is generally given as the formula 11 below.
Formula 11

$$k_1 x + k_2 y + k_3 z + k_4 = 0 \tag{11}$$

Here, $k_1$ through $k_4$ are constants.

Meanwhile, the expression of the imaginary straight line Lm passing through the principal point PPs of the imaging section 180 and the actual zoom ratio measuring point SMP on the taken image SI is given as the formula 12 below.

Formula 12

$$\frac{x - x_m}{x_0 - x_m} = \frac{y - y_m}{y_0 - y_m} = \frac{z - z_m}{z_0 - z_m} \tag{12}$$

Here, $x_0$, $y_0$, and $z_0$ are coordinates of the principal point PPs of the imaging section 180, and $x_m$, $y_m$, and $z_m$ are coordinates of the actual zoom ratio measuring point SMP on the taken image SI, all of which are coordinates of the world coordinate system. It should be noted that the coordinates $x_m$, $y_m$, and $z_m$ of the actual zoom ratio measuring point SMP on the taken image SI can be calculated based on the coordinates u, v of the actual zoom ratio measuring point SMP in the coordinate system on the taken image SI using a known coordinate conversion process.

The coordinates of the actual zoom ratio measuring point MP on the projection screen can be obtained by solving the following simultaneous equations using the formulas 11 and 12 described above.

Formula 13

$$k_1 x + k_2 y + k_3 z + k_4 = 0 \tag{13a}$$

$$\frac{x - x_m}{x_0 - x_m} = \frac{y - y_m}{y_0 - y_m} \tag{13b}$$

$$\frac{x - x_m}{x_0 - x_m} = \frac{z - z_m}{z_0 - z_m} \tag{13c}$$

The coordinates $x_m$, $y_m$, and $z_m$ of the actual zoom ratio measuring point SMP on the taken image SI are the only constants varied in accordance with the variation in the zoom ratio among the constants included in the formulas 13a, 13b, and 13c. Further, the coordinates $x_m$, $y_m$, and $z_m$ are calculated based on the coordinates u, v of the actual zoom ratio measuring point SMP in the coordinate system on the taken image SI using the known coordinate conversion process. On the other hand, the coordinates of the actual zoom ratio measuring point MP on the screen 30 obtained by solving the formulas 13a, 13b, and 13c uniquely correspond to the zoom ratio. Therefore, it is possible to uniquely determine the zoom ratio by measuring the coordinates u, v of the actual zoom ratio measuring point SMP in the coordinate system on the taken image SI.

As described above, it is possible to make a unique correlation between the coordinates u, v in the image plane of the actual zoom ratio measurement point SMP in the taken image SI and the zoom ratio of the projection optical system 150. Therefore, the zoom ratio calculation section 121 (FIG. 1) of the present embodiment is previously provided with a map having the coordinates u, v in the taken image SI and the zoom ratio of the projection optical system 150 corresponding to each other, and specifies (step S140 in FIG. 8) the actual zoom ratio using the map. After measuring the actual zoom ratio, the CPU 120 terminates the actual zoom ratio calculation process, and then starts the projection angle calculation process (see step S150 in FIG. 4) described above. Hereinabove, the actual zoom ratio calculation process is explained.

As explained above, in the keystone correction process in the first embodiment, even in the case in which the reference zoom ratio $Z_1$ is set as the zoom ratio parameter in the calculation process of the vanishing points used for the keystone correction process, the vertical correction target point $DPv_1$ and the approximate horizontal correction target point corresponding to actual zoom ratio $Z_0$ are obtained based on the actual zoom ratio $Z_0$, the reference zoom ratio $Z_1$, and the projection angles ($\theta_0$, $\phi_0$), and then the correction projection angles ($\theta_1$, $\phi_1$) are calculated. If the correction projection angles ($\theta_1$, $\phi_1$) are calculated, the keystone correction corresponding to the actual zoom ratio $Z_0$ can be performed by using the correction projection angles ($\theta_1$, $\phi_1$) as the values corresponding to the projection angle parameters in the arithmetic processing for calculating the vanishing points corresponding to the reference zoom ratio $Z_1$ and performing the keystone correction. As a result, the keystone correction process at the actual zoom ratio $Z_0$ can be performed using the arithmetic processing of the keystone correction process at the reference zoom ratio $Z_1$. Further, since the actual zoom ratio $Z_0$ is calculated using the actual zoom ratio measuring point MP in the present embodiment, the actual zoom ratio can be calculated without providing the sensors or the like for detecting the actual zoom ratio to the main body of the projector 100. Therefore, downsizing of the structure of the projector 100 becomes possible.

B. MODIFIED EXAMPLES

B1. Modified Example 1

Although in the embodiment described above in the keystone correction at the actual zoom ratio $Z_0$, $\theta_1$ is calculated using the formulas 9 and 10 based on the vertical correction target point $DPv_1$, in the modified example 1, $\theta_2$ is calculated as the correction projection angle using the formula 14 and the formula 15 below based on the horizontal correction target point $DPh_1$, and then $\theta_2$ is calculated as the correction projection angle based on $\theta_2$ thus calculated in the similar manner as explained above. Then, the keystone correction is performed using the correction projection angles ($\theta_2$, $\phi_2$) thus calculated. By performing the correction operation as described above, advantages substantially the same as those of the embodiment described above can be obtained.

Formula 14

$$\left( \frac{1}{\tan\phi_2 \cdot \cos\theta_2}, -\tan\theta_2 \right) = \left( \frac{Z_1}{Z_0} \frac{1}{\tan\phi_0 \cdot \cos\theta_0}, -\frac{Z_1}{Z_0} \tan\theta_0 \right) \quad (14)$$

Formula 15

$$\theta_2 = \text{Arctan}\left( \frac{Z_1}{Z_0} \tan\theta_0 \right) \quad (15)$$

B2. Modified Example 2

Although in the embodiment described above the actual zoom ratio measuring point MP is used as the method of obtaining the value of the actual zoom ratio, in the modified example 2, a zoom ratio detection sensor for detecting the actual zoom ratio is provided to the zoom lens drive section or the zoom lens, and the keystone correction process in the invention is performed based on the actual zoom ratio obtained by the zoom ratio detection sensor. By providing the projector 100 with the zoom ratio detection sensor, the arithmetic processing for calculating the actual zoom ratio can be eased, thus the processing speed of the keystone correction process is improved. Further, it is also possible to arrange that the user directly inputs the parameter corresponding to the projection zoom rate manually to the projector. For example, a scale for indicating the actual zoom ratio of the zoom lens is disposed at a position, which the user can view from the exterior of the projector, and the user visually reads the value of the scale, and then inputs the value to the projector. According to the configuration described above, it becomes possible to improve the processing speed of the keystone correction process and to downsize the structure of the projector without requiring the arithmetic processing for calculating the zoom ratio or the zoom ratio detection sensor.

B3. Modified Example 3

Although in the embodiment described above, the projection angles ($\theta_0$, $\phi_0$) are calculated using the principle of triangulation based on the taken image obtained by taking the projection angle measuring image displayed by projection on the screen 30, in the modified example 3, the user detects the projection angles ($\theta_0$, $\phi_0$) while visually observing the projection image displayed by projection on the screen 30. For example, the menu image for correcting the distortion of the projection image is displayed on the screen 30, and the user adjusts the distorted image to have a substantially rectangular shape while sliding a "distortion adjusting slider" on the menu image distorted due to the tilted projection by an operation with the remote controller 191. By adjusting the projection image to have a rectangular shape, the projector 100 can obtain the projection angles ($\theta_0$, $\phi_0$) using the arithmetic processing. Further, it is also possible that the user directly measures the projection angles, and then inputs the parameter corresponding to the projection angles ($\theta_0$, $\phi_0$) directly to the projector 100.

B4. Modified Example 4

Although in the embodiment described above, the projection image forming area WFS is used as the projection image, and when the projection image forming area WFS is rectangular the vanishing points and the correction target points are calculated as the point formed by the extended lines of the two pairs of sides, namely a pair of vertical sides and a pair of horizontal sides, if two pairs of parallel lines are included in the projection image, it is possible to form the vanishing points and the correction points. For example, a regular octagon or an image simply including parallel lines in a vertical direction and parallel lines in a horizontal direction can also be adopted.

The entire disclosure of Japanese Patent Application No. 2009-217091, filed Sep. 18, 2009 is expressly incorporated by reference herein.

What is claimed is:
1. A projection display device comprising:
   a projection section having an optical system capable of zooming a projection image to be projected on a projection surface, and adapted to project an image;
   a parameter obtaining section adapted to obtain a first parameter corresponding to the projection angle showing a relative posture of the projection display device to the projection surface;
   a vanishing point calculation section adapted to calculate a position of a vanishing point in displaying the image by projection on the projection surface with the projection angle, based on the first parameter;
   an actual zoom ratio obtaining section adapted to obtain an actual zoom ratio at which the projection section actually displays the image by projection on the projection surface;
   a parameter calculating section adapted to correct the first parameter based on a fixed reference zoom ratio and the actual zoom ratio to calculate a second parameter; and
   a keystone correction section adapted to perform a keystone correction of the image based on the fixed reference zoom ratio and the second parameter.

2. The projection display device according to claim 1, wherein
the parameter calculating section calculates a correction target point which corresponds to the vanishing point based on the fixed reference zoom ratio and the actual zoom ratio, and to correct the first parameter based on the correction target point to thereby calculate the second parameter.

3. The projection display device according to claim 2, wherein
the parameter calculation section calculates a position of one of the two correction target points based on the fixed reference zoom ratio and the actual zoom ratio, and a position of the vanishing point, and calculates a position of the other of the correction target points approximately using a condition, which is used when obtaining the position of the one of the correction target points, as a limiting condition, and to correct the first parameter based on the positions of the two correction target points calculated, to thereby calculate the second parameter.

4. The projection display device according to claim 3, wherein
the one of the correction target point is a correction target point corresponding to the vanishing point regarding a vertical direction, and the other of the correction target point is a correction target point corresponding to the vanishing point regarding a horizontal direction.

5. The projection display device according to claim 4, wherein
in a coordinate system having a z-axis representing a normal direction of the projection surface, an x-axis representing a horizontal direction, and a y-axis representing a vertical direction when taking a principal point of a zoom lens provided to the projection display device as an origin, when a pitch angle $\theta$, which is a relative angle between the projection surface and the projection display device using the x-axis as an axis, is $\theta_0$, the parameter calculation section applies the following formula to calculate a correction pitch angle $\theta_1$ corresponding to one of the second parameters.
($Z_0$=(actual zoom ratio), $Z_1$=(reference zoom ratio))

$$\theta_1 = \mathrm{Arctan}\left(\frac{Z_0}{Z_1}\tan\theta_0\right) \quad \text{(Formula)}$$

6. The projection display device according to claim 5, wherein
the parameter calculation section uses the correction pitch angle $\theta_1$ as the limiting condition when approximately calculating the position of the correction target point regarding the horizontal direction.

7. The projection display device according to claim 4, wherein
the image has a rectangular projection area, and the parameter calculation section calculates the correction target point corresponding to the vanishing point regarding the horizontal direction taking a condition that an extended line of an upper side of the image passes through the correction target point corresponding to the vanishing point regarding the horizontal direction, which is calculated when it is assumed that the limiting condition does not exist, and the correction target point corresponding to the vanishing point in the horizontal direction, which is calculated approximately, is located on the extended line, as a second limiting condition.

8. The projection display device according to claim 1, further comprising:
an imaging section capable of taking an image of the projection surface including the projection image displayed by projection by the projection display device,
wherein the actual zoom ratio obtaining section includes
a measuring point projection section adapted to display a measuring image by projection, the measuring image including a measuring point for calculating the actual zoom ratio, so that the measuring point is displayed at a position with an offset from the light axis of the projection light projected by the projection section,
a projection measuring point detection section adapted to image a projection measuring point, which is the measuring point displayed by projection, with the imaging section, and to detect the projection measuring point based on an image of the projection measuring point on a taken image taken by the imaging section, and
an actual zoom ratio determination section adapted to obtain position information of the projection measuring point detected, and to determine the actual zoom ratio using the position information and a previously prepared correspondence between the zoom ratio and the position information.

9. A keystone correction method for a projection display device which projects an image on a projection surface, comprising:
(a) obtaining a first parameter corresponding to a projection angle showing a relative posture of the projection display device to the projection surface;
(b) calculating a position of a vanishing point in displaying the image by projection on the projection surface with the projection angle, based on the first parameter;
(c) obtaining an actual zoom ratio at which the projection section actually displays the image by projection on the projection surface;
(d) correcting the first parameter based on a fixed reference zoom ratio and the actual zoom ratio to calculate a second parameter; and
(e) performing a keystone correction of the image based on the fixed reference zoom ratio and the second parameter.

* * * * *